United States Patent [19]
Kubota

[11] Patent Number: 5,314,272
[45] Date of Patent: May 24, 1994

[54] DRILL

[76] Inventor: Masao Kubota, 22-7, Narimasu 2-chome, Itabashi-ku Tokyo 175, Japan

[21] Appl. No.: 915,724

[22] PCT Filed: Nov. 30, 1991

[86] PCT No.: PCT/JP91/01680

§ 371 Date: Jul. 28, 1992

§ 102(e) Date: Jul. 28, 1992

[87] PCT Pub. No.: WO92/09393

PCT Pub. Date: Jun. 11, 1992

[30] Foreign Application Priority Data

Nov. 30, 1990 [JP] Japan .................. 2-330366

[51] Int. Cl.⁵ .......................................... B23B 51/02
[52] U.S. Cl. ................................... 408/224; 408/188; 408/227; 408/713
[58] Field of Search ............ 408/188, 200, 211, 223, 408/224, 227, 230, 713

[56] References Cited

U.S. PATENT DOCUMENTS 4,586,858  5/1986  Kubota .................. 408/224

FOREIGN PATENT DOCUMENTS

| 167707 | 8/1985 | Japan | 408/230 |
| 63-105808 | 5/1988 | Japan . | |
| 63-105809 | 5/1988 | Japan . | |
| 1004012 | 3/1983 | U.S.S.R. | 408/224 |
| 1127704 | 12/1984 | U.S.S.R. | 408/223 |
| 1263434 | 10/1986 | U.S.S.R. | 408/223 |

*Primary Examiner*—Daniel W. Howell
*Attorney, Agent, or Firm*—Staas & Halsey

[57] ABSTRACT

A drill of simple construction, using commercially available tips or tips obtained by simply modifying them, well balanced in cutting resistance, and capable of drilling small-diameter holes.

A main cutting edge (12) of a center-side cutting edge 1 is situated on a base line VP of a circular cone having its vertex on a point V on a tool central axis OO and a half vertical angle α. An intermediate cutting edge (2) having a length substantially equal to ½ of the length of the main cutting edge (12) is arranged on a straight line V'Q', extending parallel to a base line VQ, which is symmetrical to the base line VP with respect to the tool central axis OO and advanced ahead of the base line VQ for a lip height t mm in the axial direction, so that a straight line connecting the respective middle points of the intermediate cutting edge (2) and the main cutting edge (12) intersect the tool central axis (OO) substantially at right angles.

Since the intermediate cutting edge (2) is advanced only by the lip height t mm, a workpiece is cut by the intermediate cutting edge (2), and a portion of the main cutting edge (12) which corresponds to the intermediate cutting edge (2) is not used for cutting work, so that the cutting resistance is well balanced. Tips (20) and (21), which constitute the cutting edges individually, have a simple construction, and can be formed of commercially available tips or tips obtained by simply modifying them.

8 Claims, 9 Drawing Sheets

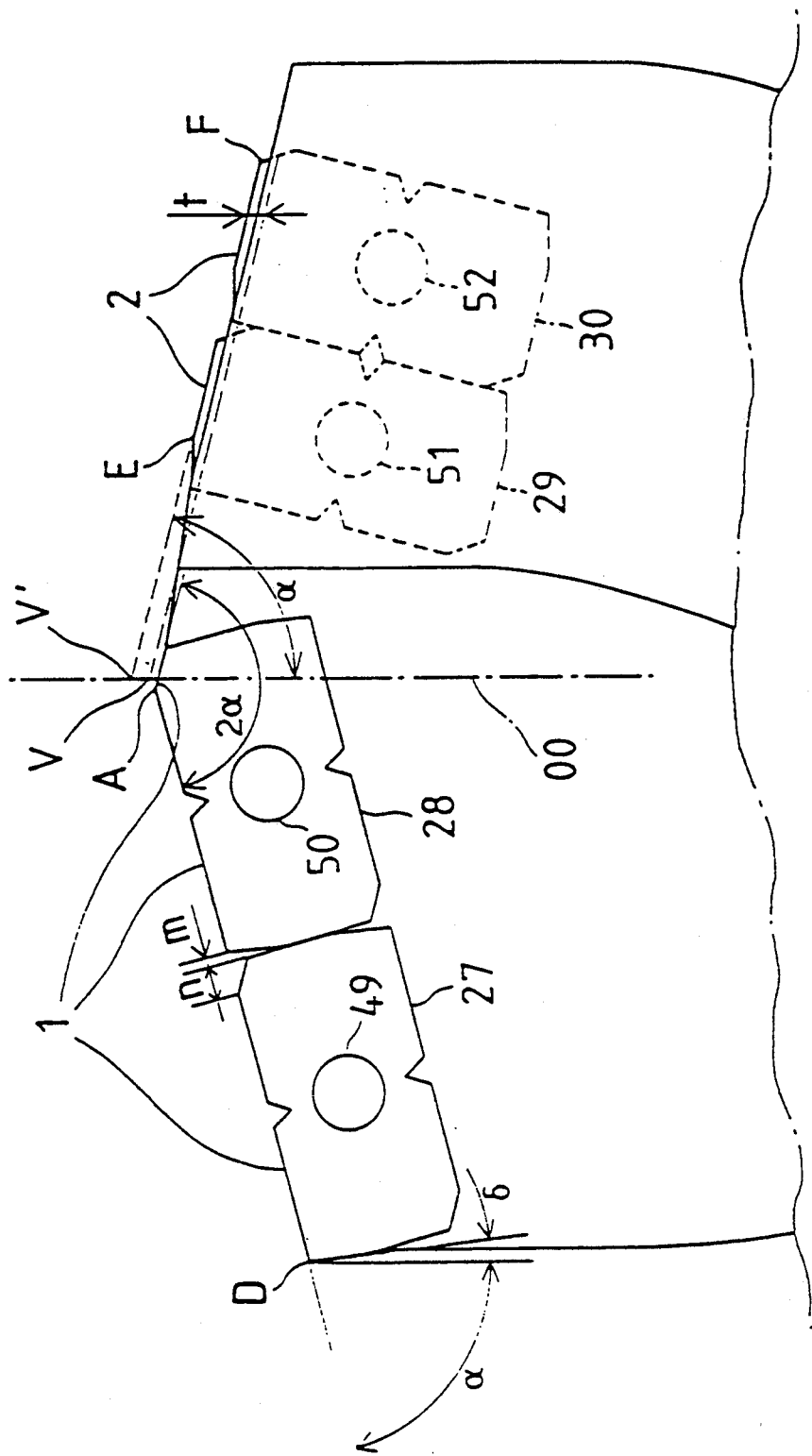

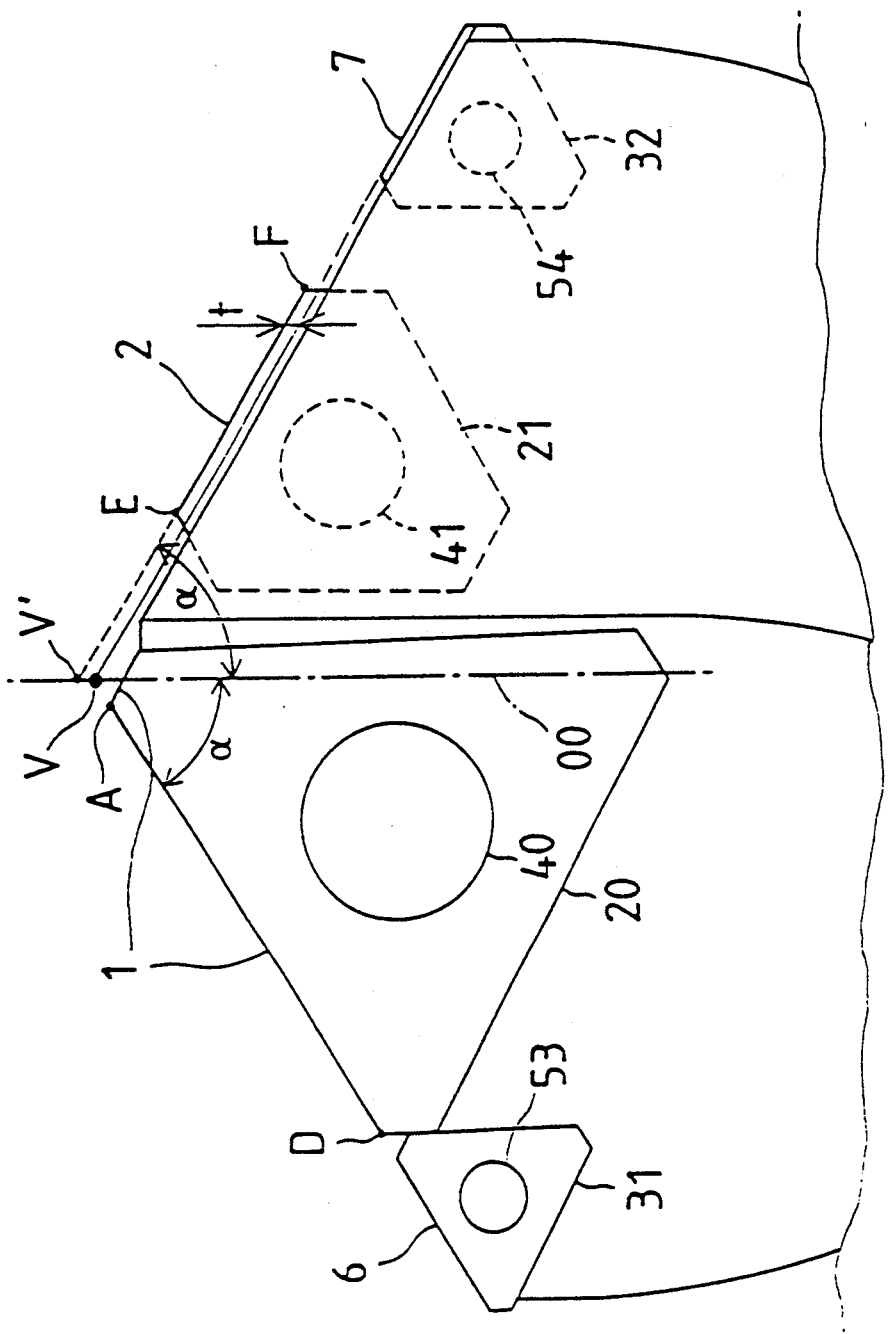

DRILL

TECHNICAL FIELD

The present invention relates to a structure of a drill which uses tips.

The present invention can be utilized for every drilling type of work, and in particular, high-efficiency operation for drilling relatively small holes.

BACKGROUND ART

Any of the drills using conventional tips has a relatively large outer diameter in order to maintain the balance of cutting resistance between a central edge and an outer peripheral edge. Described in U.S. Pat. No. 4,586,858 and Published Unexamined Japanese Patent Application No. 62-84912, by the inventor hereof, are drills which use tips of special shapes such that they can drill holes of relatively small diameters, and thus drills which use tips intended for drilling relatively small holes have been known publicly.

In a drill disclosed in U.S. Pat. No. 4,586,858, however, a plurality of tips are arranged constituting cutting edges, and portions without the tips are provided so that the cutting edges are partially discontinuous, whereby left- and right-hand cutting edges are well balanced in cutting resistance. In this case, however, the diameter of each work hole can be reduced by only a limited amount. In a drill described as an alternative embodiment, on the other hand, tips constituting cutting edges are specially worked so that a portion incapable of cutting work is arranged at part of the cutting edge, whereby the cutting resistance is well balanced. In this case, special processing of the cutting edges entails high cost.

Further, in a drill described in Published Unexamined Japanese Patent Application No. 62-84912, tips constituting cutting edges are also specially worked so that a portion incapable of cutting work is arranged at part of the cutting edge, whereby the cutting resistance is well balanced. This drill also entails high cost.

DISCLOSURE OF THE INVENTION

The object of the present invention is to provide a drill of simple construction using commercially available tips, if possible, or minimally modified versions thereof, and applicable to drilling work for small-diameter holes.

In order to achieve the above object, the present invention is arranged so that a half vertical angle formed between the ridge of a center-side cutting edge and the center line of a tool is equal to a half vertical angle formed between the ridge of an intermediate cutting edge on the opposite side and the tool center line, a straight line connecting the middle point of the length of the ridge between the opposite ends of the center-side cutting edge and the middle point of the length of the ridge between the opposite ends of the intermediate cutting edge extends substantially at right angles to the tool center line, the length of the ridge between the opposite ends of the center-side cutting edge is substantially twice that of the ridge between the opposite ends of the intermediate cutting edge, and the ridge of the intermediate cutting edge has a lip height in the direction of the tool axis, above the level of the ridge of the center-side cutting edge, the lip height being greater than ½ of the feed per drill revolution. Preferably, moreover, the center-side cutting edge and the intermediate cutting edge are composed individually of tips removably fixed to the body of a drill. Preferably, the tip is formed by uniformly removing the region near each vertex of an equilateral triangular configuration so that each side constitutes a cutting edge. Alternatively, the tip has a rectangular basic configuration, and is formed by uniformly removing each two corresponding vertices on each diagonal so that each side constitutes a cutting edge. Two tips of different sizes are fixed to the drill body so that the respective one sides of the tips constitute the center-side cutting edge and the intermediate cutting edge individually. When increasing the diameter of work holes, tips of the same shape and size having cutting edges are fixed in symmetrical positions outside the center-side cutting edge and the intermediate cutting edge individually.

According to another aspect of the present invention, the tip is formed by uniformly removing the region near each vertex of an equilateral triangular configuration so that each side constitutes a cutting edge and a nick is provided at the central portion of each side. Two tips of the same shape and size are fixed to the drill body so that the respective one sides of the two tips are situated on the ridge of the center-side cutting edge, the respective one sides of the two tips constituting the center-side cutting edge. Further, a tip having the same shape and size as the aforesaid tips is fixed to the drill body so that one side of the tip constitutes the intermediate cutting edge.

According to still another aspect of the present invention, the tip is formed by uniformly removing the regions near each two corresponding vertices on each diagonal of a rectangular configuration so that each side constitutes a cutting edge, and one of two tips of the same shape is fixed to the drill body so that a long side of the tip constitutes the center-side cutting edge. Further, the other tip is fixed to the drill body so that a short side of the tip constitutes the intermediate cutting edge.

According to a further aspect of the present invention, the tip is formed by uniformly removing the regions near each two corresponding vertices on each diagonal of a rectangular configuration so that each side constitutes a cutting edge, providing a nick at the central portion of each long side. Two tips of the same shape and size are fixed to the drill body so that the respective long sides of the two tips are situated on the ridge of the center-side cutting edge, the respective long sides of the two tips constituting the center-side cutting edge. Further, two tips having the same shape and size as the aforesaid tips are fixed to the drill body so that the respective short sides of the two tips are situated on the ridge of the intermediate cutting edge, the respective short sides of the two tips constituting the intermediate cutting edge.

According to the present invention, as described above, the ridge of the intermediate cutting edge has a lip height in the direction of the tool axis, above the level of the ridge of the center-side cutting edge, the lip height being greater than ½ of the feed per drill revolution, so that part of a portion to be cut originally by the center-side cutting edge is cut by the intermediate cutting edge, which is 180° ahead of the center-side cutting edge, so that the center-side cutting edge will not cut the portion cut by the intermediate cutting edge. Further, the length of the ridge between the opposite ends of the center-side cutting edge is substantially twice that of the ridge between the opposite ends of the intermediate cutting edge, so that a high-performance drill can be obtained enjoying a simple construction and well-balanced cutting resistance. Since different regions are cut by the center-side cutting edge and the intermediate cutting edge, an introduction of an error between the left- and right-hand half vertical angles upon the balance is very small. Thus, a drill better balanced than conventional drills can be obtained.

Furthermore, the drill of the present invention can be obtained by using commercially available tips or tips obtained by simply modifying them.

BRIEF DESCRIPTION OF THE DRAWINGS

FIG. 7 is a front view of a drill end according to a fourth embodiment of the present invention using a combination of tips of the same shape and size having a rectangular basic configuration; and FIG. 8 is a front view of a drill end according to a fifth embodiment of the present invention using additional tips to the arrangement of the first embodiment for increasing the diameter of work holes.

DETAILED DESCRIPTION OF THE INVENTION

Figure 1A:
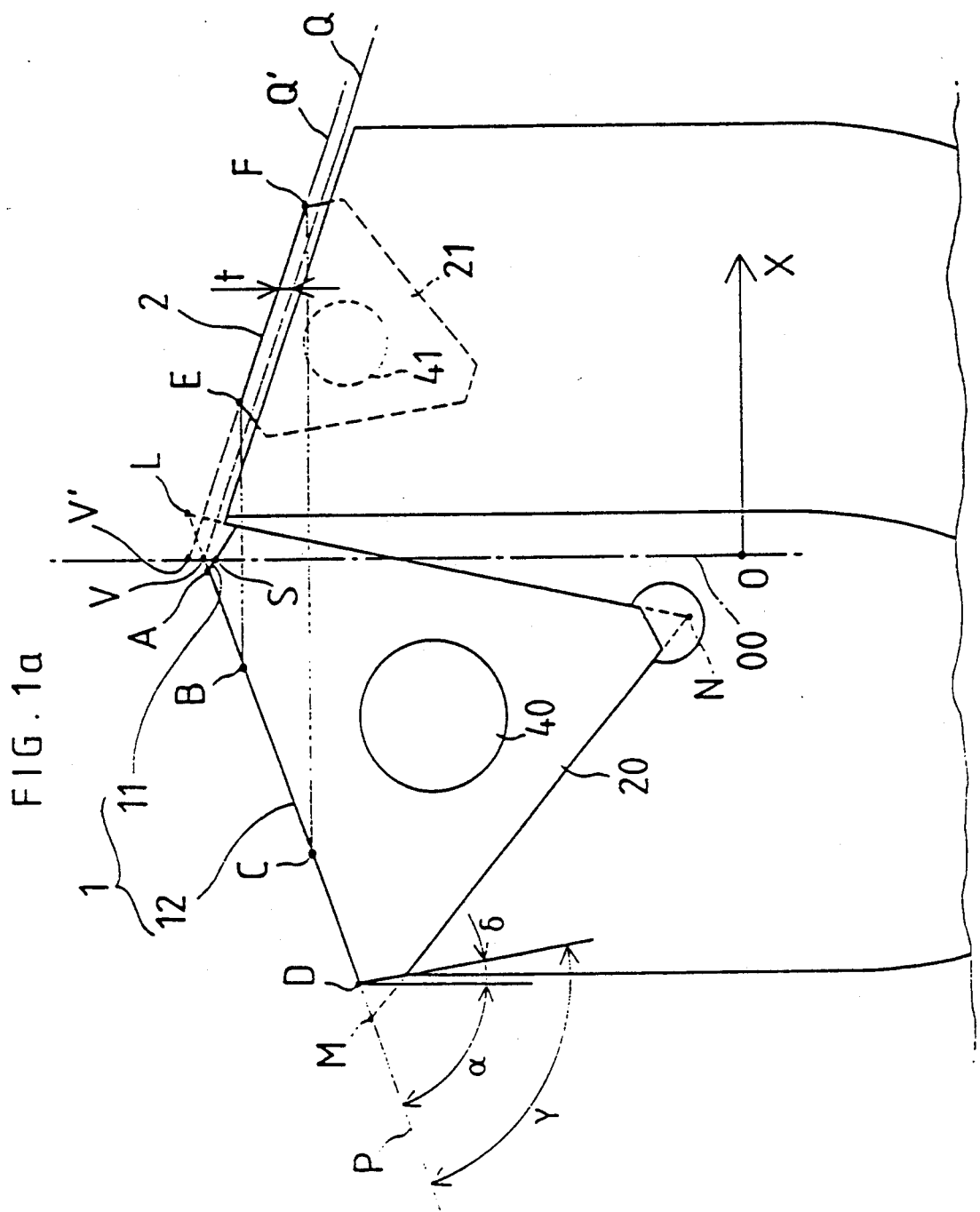
FIG. 1(a) is a front view of a drill end according to a first embodiment of the present invention using one tip having an equilateral triangular basic configuration as a tip on each side.
Figure 1B:
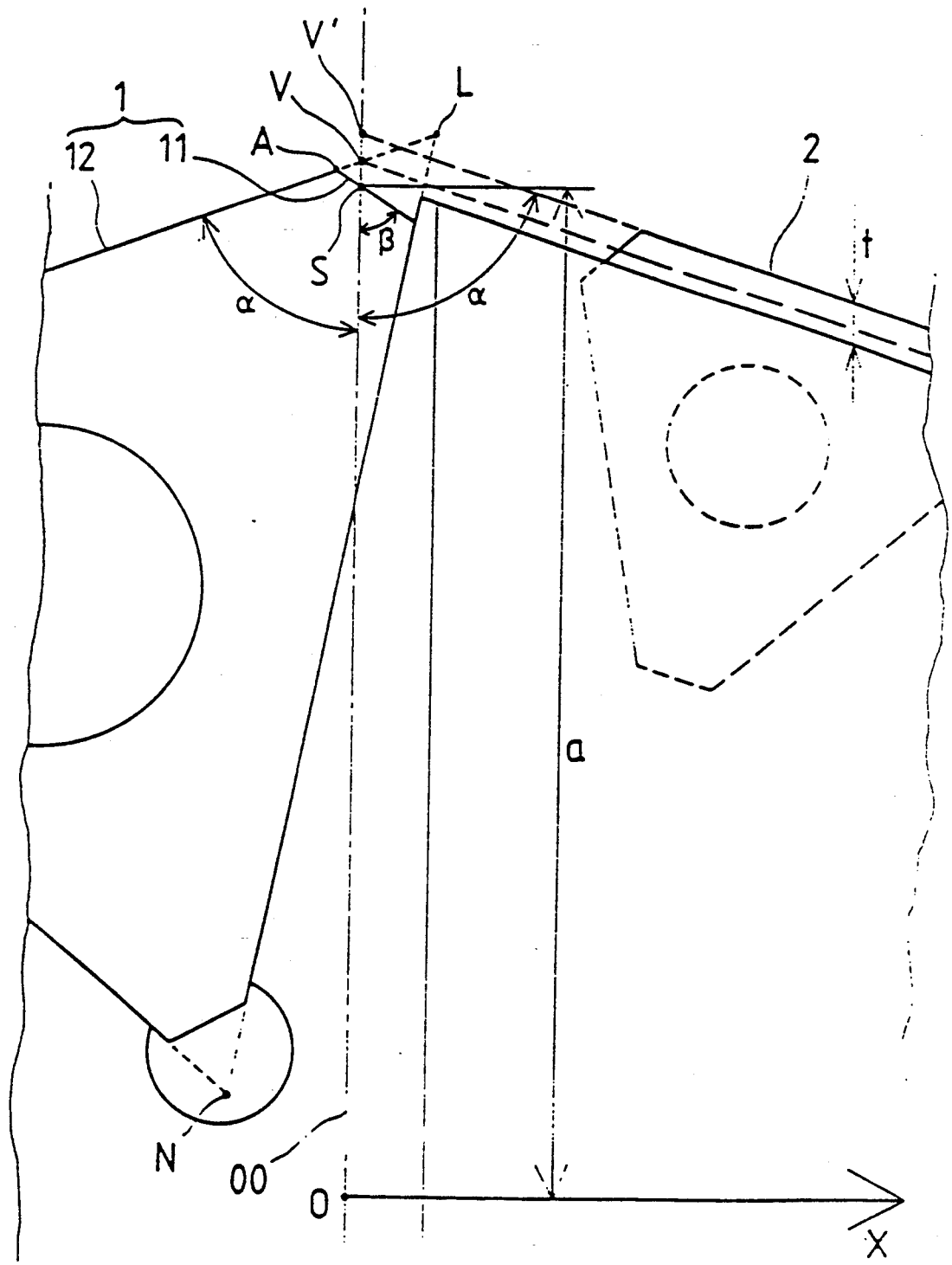
FIG. 1(b) is an enlarged view of the drill end portion shown in FIG. 1(a)
Figure 2:
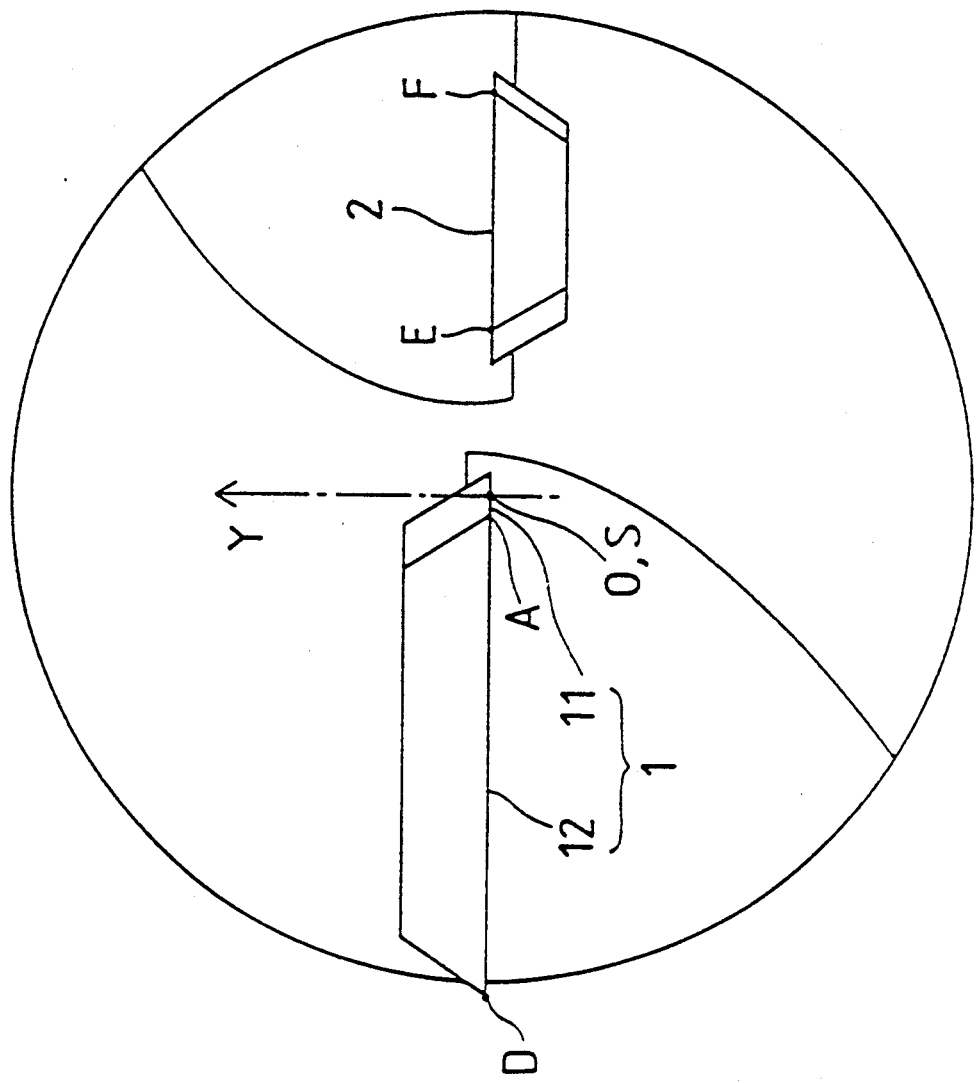
FIG. 2 is a plan view of the first embodiment.

Referring to FIGS. 1(a), 1(b) and 2, a drill according to a first embodiment of the present invention is used to drill a work hole (not shown) in a workpiece (not shown), and a distal end of the drill is provided with a center-side cutting edge 1 (left-hand cutting edge in FIG. 1) and an intermediate cutting edge 2 (right-hand cutting edge in FIG. 1) for cutting the workpiece. A chip breaker and the like are not shown (in other embodiments also). The center-side cutting edge 1 is composed of a central cutting edge 11, which extends from a point S on a tool central axis OO to a cutting edge end A, and a main cutting edge 12 which extends from the end A to an outer end D. The main cutting edge 12 is situated on a base line VP of a circular cone having its vertex on a point V on the tool central axis OO and a half vertical angle $\alpha$. The intermediate cutting edge 2 has its two opposite ends individually on two intermediate points E and F on a straight line V'Q', extending parallel to a base line VQ, which is symmetrical to the base line VP with respect to the tool central axis OO, and advanced t mm ahead of the base line VQ in the axial direction. In this case, however, the maximum feed for each revolution of the drill is f mm/rev, and "t" is a little greater than "f/2". The value "t" is called an axial lip height (relative cutting edge height in the axial direction). If this value is greater than $\frac{1}{2}$ of the feed per drill revolution, part of a portion to be cut originally by the center-side cutting edge 1 is cut by the intermediate cutting edge 2, which operates 180° ahead of the center-side cutting edge 1, so that the corresponding portion BC of the center-side cutting edge 1 (main cutting edge 12) on the opposite side does not effect cutting work.

In this first embodiment, the center-side cutting edge 1 and the intermediate cutting edge 2 are respectively composed of one side of basic equilateral triangular tips 20 and 21, and these tips 20 and 21 are removably fixed to the body of the drill by means of bolts 40 and 41, respectively. As shown in FIG. 1, the main cutting edge 12 is located on a side LM of a basic equilateral triangle LMN, and the tip 20 is formed by removing the region near each vertex of the basic equilateral triangle so that an outside angle $\gamma$ at the outer end D becomes equal to the sum of the half vertical angle $\alpha$ and a relief angle $\delta$ in the axial direction of the tool, thereby providing the cutting edge on each side. Thus, the inside angle at the vertex A is $60°+\gamma$. If the vertical angle of the drill is 118°, or if the half vertical angle $\alpha$ is 59°, the axial relief angle $\delta$ at the outer end D of the cutting edge is 1°, whereas an angle $\beta$ formed between the tool central axis OO and the central cutting edge 11 is 61°. The intermediate cutting edge 2, which provides the lip height t exceeding $\frac{1}{2}$ of the feed per drill revolution, should preferably be composed of the tip 21 which is formed by removing the region near each vertex of a basic equilateral triangle, each side of which is longer than $\frac{1}{2}$ of LM, in parallel to the opposite side so that $\overline{EF}=\overline{AD}/2$. A cutting edge is provided on each side of the tip 21, such a side being used as the intermediate cutting edge 2.

Thereupon, let us suppose a condition for the drill having the aforementioned cutting edges such that a bending moment on the drill caused by the cutting resistance is zero.

We have $f_n = f_c/k$, where $f_c$ (kgf/mm) is a circumferential component of the cutting resistance for each unit length of s (mm) along the cutting edge; $f_n$ (kgf/mm) is a cutting resistance component perpendicular to the cutting edge within a plane containing the tool central axis OO and the ridge of the cutting edge; and k is a constant. If a cutting resistance component in the axial direction of the drill and a cutting resistance component in the radial direction are $f_t$ (kgf/mm) and $f_r$ (kgf/mm), respectively, the cutting resistance for a fine length ds $(=dr/\sin\alpha)$ of the cutting edge at an optional point (radius r (mm)) on the cutting edge on the base line having the half vertical angle $\alpha$ may be expressed as follows:

$f_c \cdot ds = k \cdot f_n \cdot dr/\sin\alpha$ with respect to the circumferential direction, $f_t \cdot ds = f_n \cdot \sin\alpha \cdot dr/\sin\alpha = f_n \cdot dr$ with respect to the axial direction, and $f_r \cdot ds = f_n \cdot \cos\alpha \cdot dr/\sin\alpha = f_n \cdot \cot\alpha \cdot dr$ with respect to the radial direction. If those points on the main cutting edge 12 which correspond to the opposite ends E and F of the intermediate cutting edge 2 are given as B and C respectively, there will be no cutting action between the points B and C.

If bending moments around a horizontal axis OX passing an optional point O ($\overline{OS}=a$) on the tool central axis OO and an axis OY (perpendicular to the drawing plane of FIG. 1) perpendicular to the tool central axis OO and the horizontal axis are assumed, the condition for the removal of the bending moment on the drill can be obtained where bending moments are respectively given as zero.

The bending moment around the axis OX may be given by $$\int_S^A (a + r\cdot\cot\beta)f_c ds + \int_A^B (a' - r\cdot\cot\alpha)f_c ds +$$

$$\int_C^D (a' - r\cdot\cot\alpha)f_c ds - \int_E^F (a' - r\cdot\cot\alpha)f_c ds = 0,$$

where $a' = a + r_B(\cot\alpha + \cot\beta)$.

Since differences in level at the points E and F are respectively small, cutting resistances due to the difference in level are ignored.

If the above integral is executed supposing radii r at the points A, B, C, D, E and F to be $r_A$, $r_B$, $r_C$, $r_D$ and $r_E$ respectively, we obtain $$[a\cdot r + (r/2)\cot\beta]_0^{r_A} + [a'\cdot r - (r/2)\cot\alpha]_{r_A}^{r_B} +$$

$$[a'\cdot r - (r/2)\cot\alpha]_{r_C}^{r_D} - [a'\cdot r - (r/2)\cot\alpha]_{r_E}^{r_F} = 0.$$

Since the point D corresponds to the outer end of the drill, the radius $r_D$ is equal to the radius $r_O$ of the drill, that is, $r_D = r_O$. Rearranging the equation for simplicity with use of $r_B \approx r_E$, $r_C \approx r_F$, and $\alpha \approx \beta$, we obtain $$a'(r_O - 2r_F + 2r_E) - r_A^2 \cot\alpha - (\tfrac{1}{2})(r_O^2 - 2r_F^2 + 2r_E^2)\cot\alpha = 0. \quad (1)$$

Likewise, if the bending moment around the horizontal axis OY is given as zero, we obtain $$\int_S^A (a + r\cdot\cot\beta)f_t ds + \int_A^B (a' - r\cdot\cot\alpha)f_t ds +$$

$$\int_C^D (a' - r\cdot\cot\alpha)f_t ds - \int_S^A rf_t ds - \int_A^B rf_t ds - \int_C^D rf_t ds -$$

$$\left[\int_E^F (a' - r\cdot\cot\alpha)f_t ds - \int_E^F rf_t ds\right] = 0.$$

Executing this integral, we obtain $$[a\cdot r + (r^2/2)\cot\beta]_0^{r_A}\cot\beta + [[a'\cdot r - (r^2/2)\cot\alpha]_{r_A}^{r_B} +$$

$$[a'\cdot r - (r^2/2)\cot\alpha]_{r_C}^{r_D}]\cot\alpha - [r^2/2]_0^{r_A} - [r^2/2]_{r_A}^{r_B} - [r^2/2]_{r_C}^{r_D} -$$

$$[[a'\cdot r - (r^2/2)\cot\alpha]_{r_E}^{r_F}\cot\alpha - [r^2/2]_{r_E}^{r_F}] = 0.$$

In the same manner as aforesaid, we obtain $$a'(r_O - 2r_F + 2r_E) - r_A^2\cot\alpha - (1/\sin 2\alpha)(r_O^2 - 2r_F^2 + 2r_E^2) = 0. \quad (2)$$

Subtracting the opposite sides of equation (2) from their corresponding sides of equation (1), we obtain $$\tan(\alpha/2)\cdot(r_O^2 - 2r_F^2 + 2r_E^2) = 0.$$

Accordingly, we obtain $$r_O^2 - 2r_F^2 + 2r_E^2 = 0. \quad (3)$$

From equation (1) or (2), therefore, we obtain $a'(r_O - 2r_F + 2r_E) - \cot\alpha\cdot r_A^2 = 0$. In order to fulfill this equation regardless of the values of a' and $\alpha$, we should be given $$r_O - 2r_F + 2r_E = 0, \quad (4)$$

$$r_A = 0. \quad (5)$$

In order to avoid r<0 despite a practical mounting error, r>0 should be given. Since the value r is small, only a small error is caused even where r>0. If r is small enough, it hardly affects the balance of the cutting resistance even though $\beta \neq \alpha$. Since the differences in level at the point E and F serve to cancel the influence of r, errors attributable to neglect of the differences in level are scanty.

From equation (3) and (4), we obtain $$r_E = r_O/4,$$

$$r_R = 3r_O/4. \quad (6)$$

That is, the bending moment acting on the drill can be removed by mounting the tips 20 and 21 on the drill body in a manner such that a straight line connecting the respective middle points of the intermediate cutting edge 2 and the main cutting edge 12 intersect the tool central axis OO substantially at right angles when the length EF of the intermediate cutting edge 2 is made equal to ½ of the length AD of the main cutting edge 12 of the center-side cutting edge 11 in accordance with equation (6).

According to this first embodiment, only one tip, that is, one of the tips 20 and 21 is arranged on each side, so that the invention may be also applied to a drill with a relatively small diameter. If the tip 21 of the intermediate cutting edge 2 is so small that the strength of the tip or mounting screws is not large enough, it is replaced with a greater tip in which regions near its vertices are removed wide. In some cases, a square may be used as a basic configuration of the tip 21 for the intermediate cutting edge.

The following is a description of a drill according to a second embodiment of the present invention. In the present embodiment, tips which constitute a center-side cutting edge and an intermediate cutting edge have a rectangular basic configuration. Thus, the present embodiment differs from the first embodiment in tip configuration. For other basic arrangements, the present embodiment resembles the first embodiment, so that common reference numerals are used to designate those elements which are common to the two embodiments, and a description of these elements is omitted.

Figure 3:
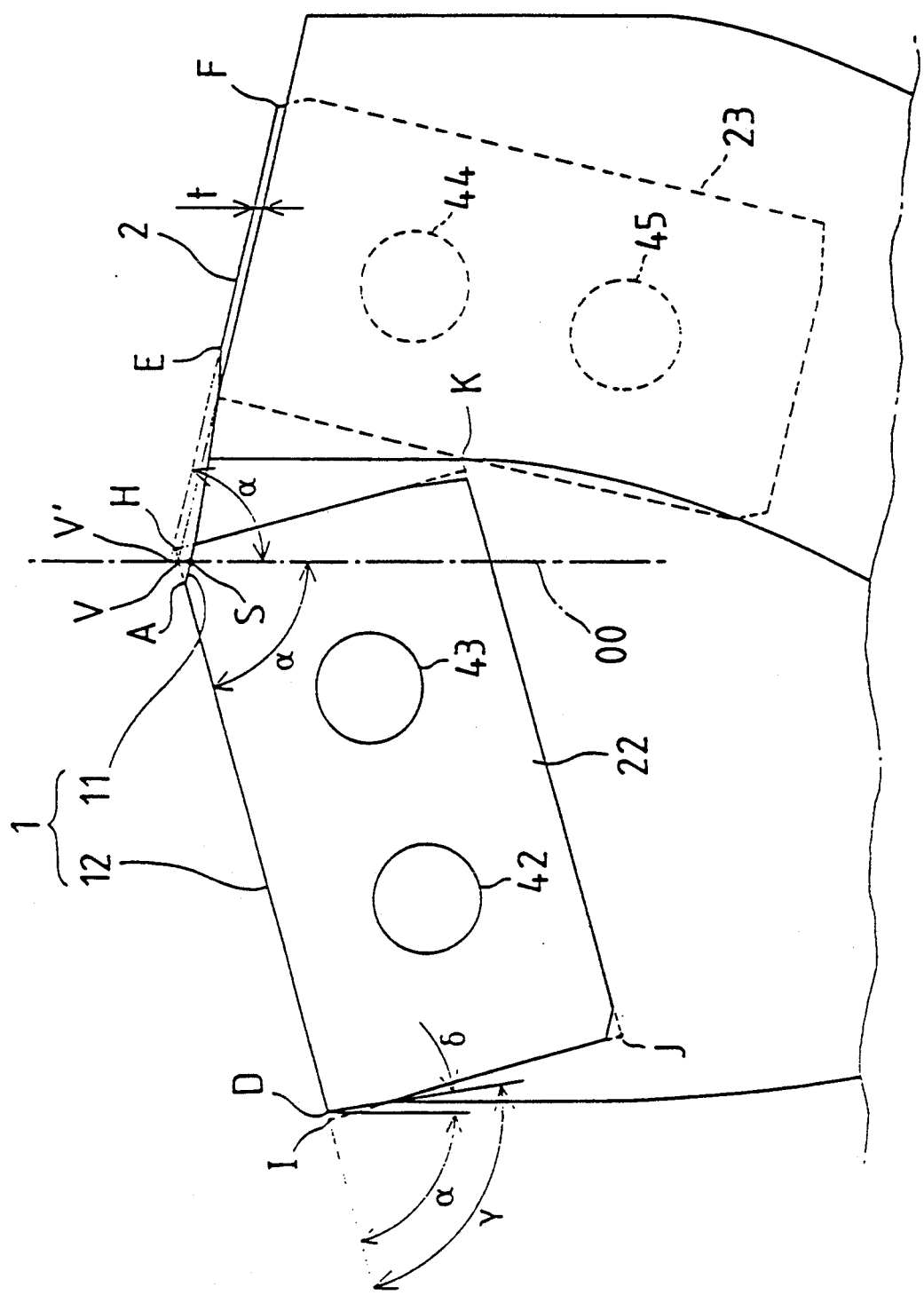
FIG. 3 is a front view of a drill end according to a second embodiment of the present invention using one tip having a rectangular basic configuration as a tip on each side.
Figure 4:
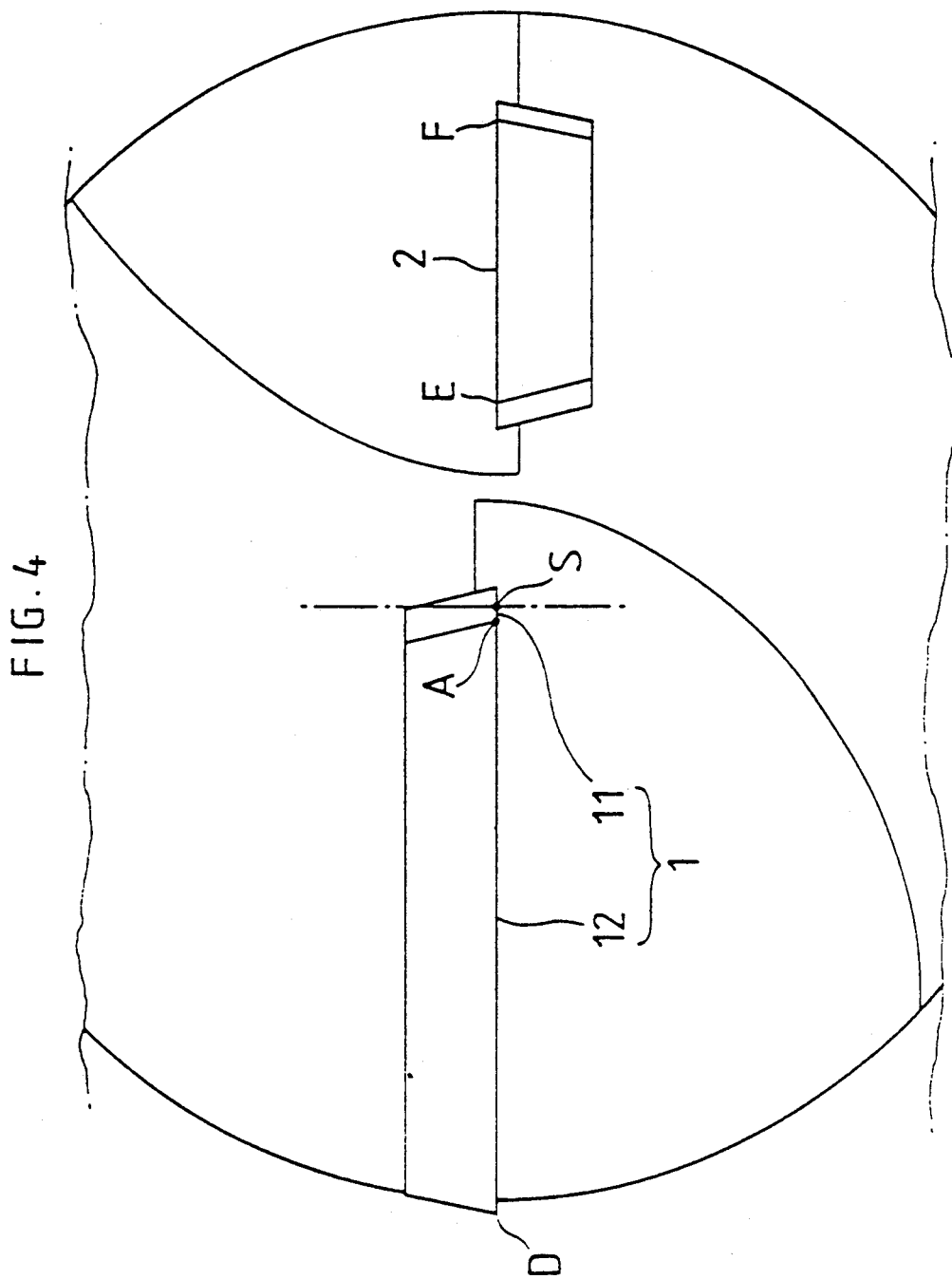
FIG. 4 is a plan view of the second embodiment.

Referring to FIGS. 3 and 4, a rectangle having vertices H, I, J and K (and having long sides HI and JK and short sides IJ and KH) is used as a basic configuration of tips 22 and 23 as shown in FIG. 3. With respect to the center-side cutting edge 1, regions near the vertices I (and K) are removed so that an outside angle at an outer end D is equal to the sum $(\alpha + \delta)$ of a half vertical angle $\alpha$ and a relief angle $\delta$ in the axial direction of the tool, and regions near the vertex H (and also vertex J) are removed so that an inside angle at a cutting edge end A becomes $2\alpha$, forming a central cutting edge 11. For example, $\alpha = 75°$ and $\delta = 1°$ are appropriate practical values. Those portions left after removing the respective opposite ends of the long and short sides are used as cutting edges. A long-side portion and a short-side portion are used as a main cutting edge 12 (on the left-hand side) and an intermediate cutting edge 2 (on the right-hand side), respectively, and the tips 22 and 23 are removably fixed to the drill body by means of bolts 42 to 45. The respective widths of the main cutting edge 12 and the intermediate cutting edge are in the ratio of 2:1. In this case, two cutting edges of each tip can be used alternately by changing the left- and right-hand tips with each other. The tips 22 and 23 of the same shape and size are used according to this second embodiment; however, tips of different sizes may be used for the center-side and intermediate cutting edges.

Figure 5:
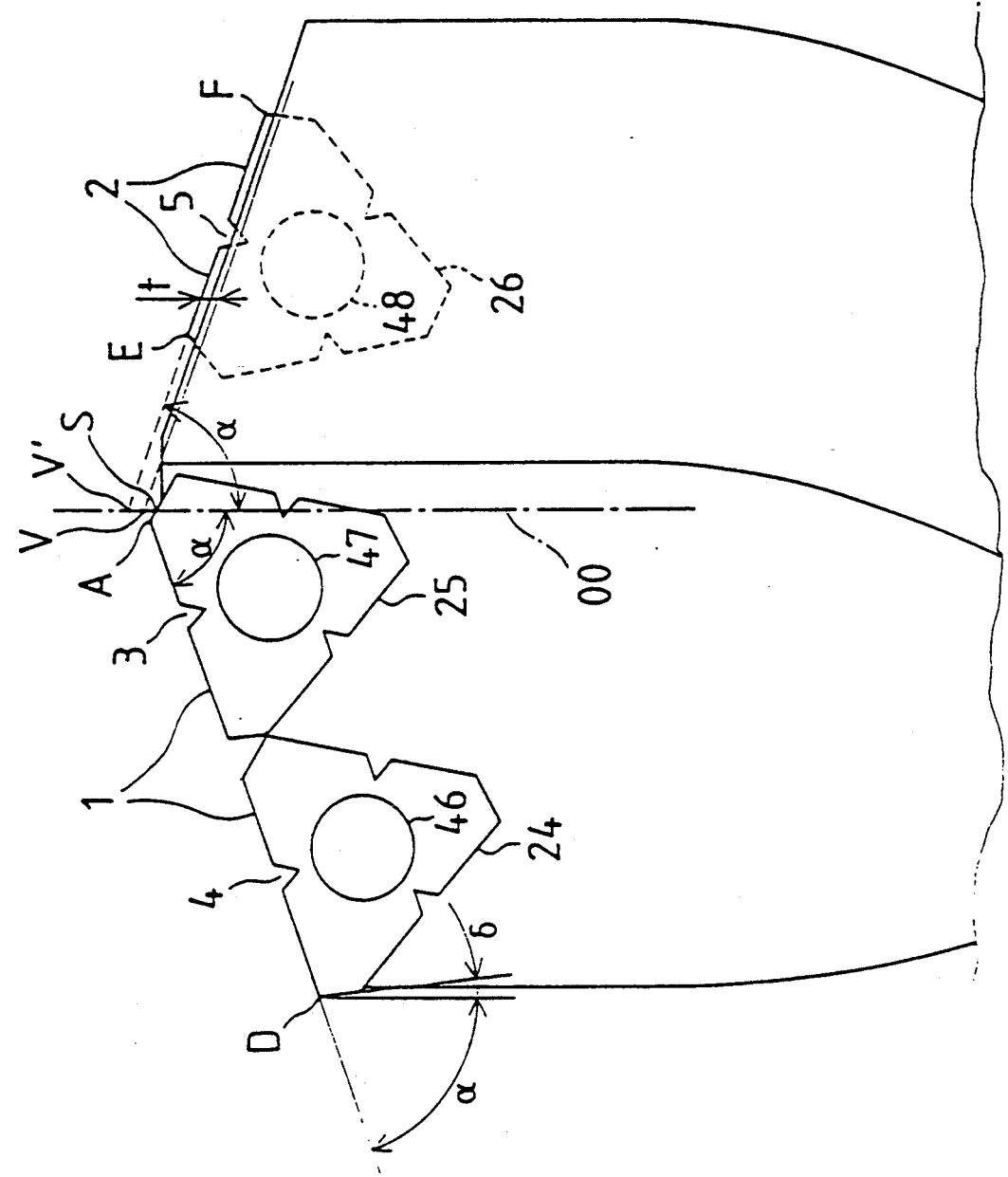
FIG. 5 is a front view of a drill end according to a third embodiment of the present invention using a combination of tips of the same shape and size having an equilateral triangular basic configuration.
Figure 6:
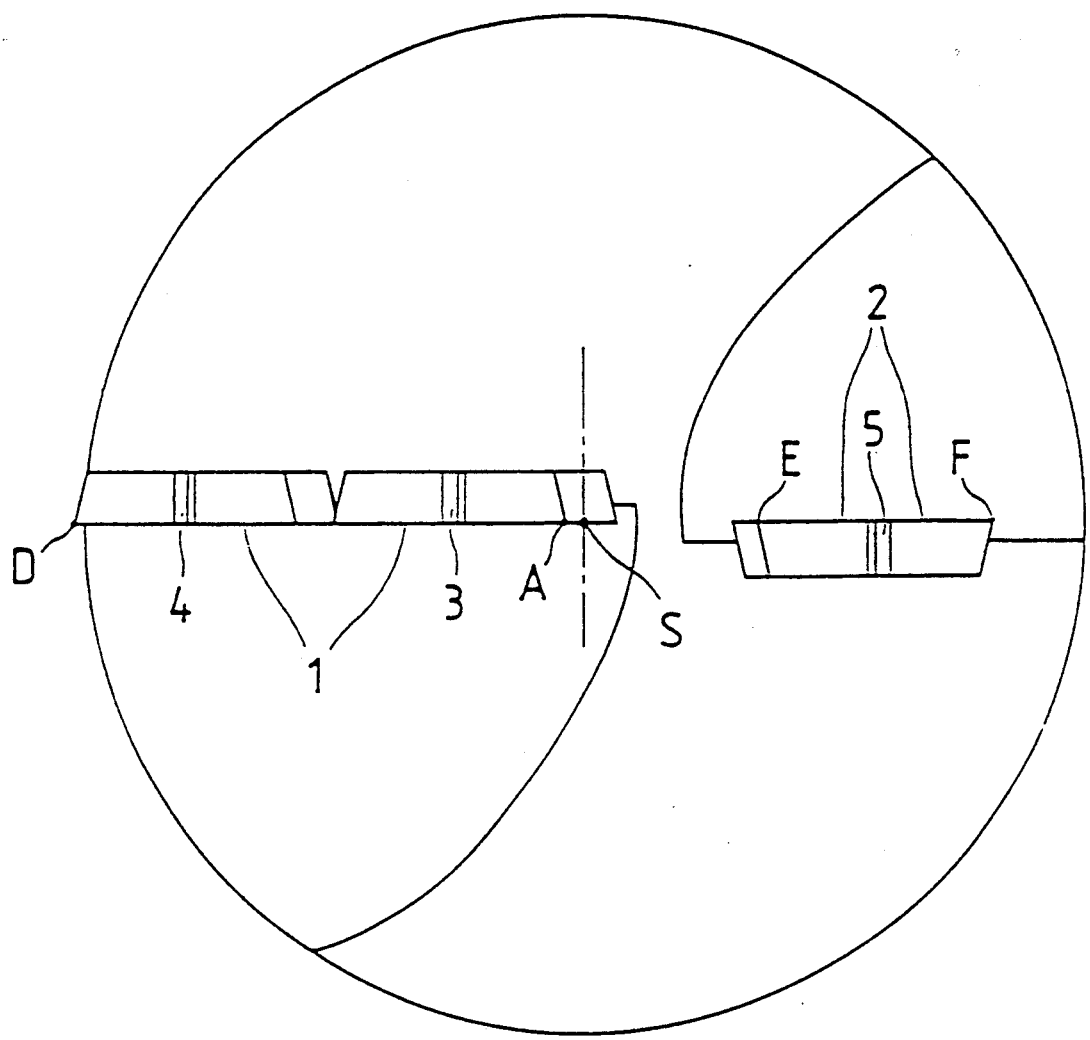
FIG. 6 is a plan view of the third embodiment.

The following is a description of a drill according to a third embodiment of the present invention. The drill of the present embodiment is one whose cutting edges are formed by combining tips of the same shape and size having a equilateral triangular basic configuration. This drill differs from the drill of the first embodiment in that a center-side cutting edge 1 is composed of tips 24 and 25 of the same shape and size. Referring to FIGS. 5 and 6, the regions near the respective vertices of tips 24, 25 and 26 are uniformly removed so that an outside angle at each outer end is equal to the sum $(\alpha+\delta)$ of a half vertical angle $\alpha$ and a relief angle $\delta$ in the axial direction of the tool, and nicks 3, 4 and 5 are provided individually at the respective central portions of the individual sides so that the cutting edges are arranged on each side. Although nicks generally serve to fractionalize swarf, the nicks 3 and 4 of this embodiment serve as boundaries between cutting regions. The tips 24, 25 and 26 have the same shape and size. The two tips 24 and 25, whose cutting edges are situated on the base line of a circular cone having a half vertical cutting edge angle $\alpha$, are arranged closely in contact with each other, and are removably fixed to the drill body by means of bolts 46 and 47 so that a main cutting edge 12 is composed of one side of each of the tips 24 and 25. On the opposite side of the tool central axis OO, the single tip 26 is removably fixed to the drill body by means of a bolt 48 so that an intermediate cutting edge 2 with a required lip height is composed of one side of the tip 26.

Those cutting edge portions of the tips 24 and 25, which constitute the center-side cutting edge 1, extend between the nicks 3 and 4, correspond to the intermediate cutting edge 2, and cutting is effected by means of the intermediate cutting edge 2. The cutting edge portions between the nicks 3 and 4 are fixed within a region which is not used in the cutting work. With use of this arrangement, influences of the nicks upon the bending moment caused by the cutting resistance are canceled to maintain balance. The tips 24, 25 and 26, which constitute the cutting edges, may be replaced with one another so that intact cutting edges are used. Where $\alpha+\delta=60°$, in particular, the tips have a symmetrical configuration, so that the construction is simple and practical.

The following is a description of a drill according to a fourth embodiment of the present invention. The drill of the present embodiment is a drill whose cutting edges are formed by combining tips of the same shape and size having a rectangular basic configuration. This drill differs from the drill of the third embodiment in that the tip configuration is rectangular.

Referring to FIG. 7, tips 27, 28, 29 and 30, which are of the same shape and size, each have a rectangular basic configuration whose long and short sides have lengths substantially in the ratio of 2:1. When a center-side cutting edge 1 is composed of the respective long sides of the two tips 27 and 28, the outer end portion of each long side is removed aslant for a fine length m so that the outside angle becomes equal to the sum $(\alpha+\delta)$ of a half vertical angle $\alpha$ and a relief angle $\delta$ in the axial direction of the tool, and the center-side end portion of each side is obliquely removed for a fine length n so that the inside angle becomes $2\alpha$. Thus, a nick with a width (m+n) is provided in the central portion of a main cutting edge. A cutting edge is provided on each side. In this manner, the tips 27 to 30 are formed having the same shape and the same size.

The cutting edges on the respective long sides of the tips 27 and 28 are situated on the base line of a circular cone having a half vertical cutting edge angle $\alpha$. The tips 27 and 28 are arranged closely in contact with each other and are removably fixed to the drill body by means of bolts 49 and 50, whereby the center-side cutting edge is formed. On the opposite side of the tool central axis OO, the tips 29 and 30 are arranged, each extending vertically long, so that their respective short sides are used as cutting edges and are removably fixed to the drill body by means of bolts 51 and 52, whereby an intermediate cutting edge 2 is formed having a required lip height. The positions of arrangement of the tips 29 and 30, which constitute the intermediate cutting edge 2, corresponds to the position between two nicks of the center-side cutting edge 1. Since the workpiece is cut by means of the intermediate cutting edge 2, the cutting edge portion between the two nicks of the center-side cutting edge 1 is not used for cutting work. Thus, new cutting edges can be obtained by replacing the tips 27 and 28.

The following is a description of a drill according to a fifth embodiment of the present invention. The drill of the present embodiment is obtained by adding tips to the drill of the first embodiment so that a work hole of a larger diameter can be formed. In FIG. 8, as compared with the drill of the first embodiment shown in FIG. 1, tips 31 and 32 of the same shape and size are removably fixed in symmetrical positions outside left-and right-hand cutting edges of the drill by means of bolts 53 and 54, respectively, to form cutting edges 6 and 7 with one side of the tips 31 and 32, respectively. The cutting edge 6, formed of the tip 31 added to a center-side cutting edge 1, is located on the same line with a main cutting edge of the center-side cutting edge 1, whereas the cutting edge 7, which is formed of the tip 32 added to an intermediate cutting edge 2, is arranged without a lip height t.

Advantages of the present invention will now be enumerated.

(1) Since the lip height is provided for the intermediate cutting edge so that the portion of the center-side cutting edge corresponding to the intermediate cutting edge does not effect cutting work, the cutting resistance is well balanced.

(2) Commercially available tips or tips obtained by simply modifying such tips can be used for constituting the cutting edges by simply providing the intermediate cutting edge with the lip height, so that a low-cost drill capable of drilling small-diameter holes can be obtained.

(3) Since the individual sides of the tips constitute the cutting edges, the tips can be effectively used by being refixed so that another side of each tip serves as a new cutting edge of the drill when a cutting edge on one side of the tip is used up.

What is claimed is:

1. A drill having a drill body, a tool center line and a feed per drill revolution, said drill comprising:

a first cutting edge forming a first angle with the tool center line;

a second cutting edge located in a same plane as said first cutting edge and on an opposite side of the tool center line, said second cutting edge forming a second angle with said tool center line equal to said first angle;

a middle point of said first cutting edge and a middle point of said second cutting edge connected by an imaginary straight line extending substantially perpendicular to the tool center line;

a length of said first cutting edge being substantially twice a length of said second cutting edge; and said second cutting edge having a lip height in a direction of the tool center line, above a level of said first cutting edge, said lip height being greater than ½ of the feed per drill revolution.

2. The drill according to claim 1, wherein said first cutting edge and said second cutting edge comprise tips fixed to the drill body.

3. The drill according to claim 2, wherein each of said tips is removably fixed to the drill body.

4. The drill according to claim 3, wherein said tips comprise:

a first tip having a substantially equilateral triangular configuration defined by three first tip vertices with respective regions, uniform in shape near each first tip vertex, removed, each side of said first tip, defined by two of said three first tip vertices, being a cutting edge, one of said cutting edges of said first tip being said first cutting edge; and a second tip having a substantially equilateral triangle configuration different in size than said first tip and defined by three second tip vertices, with respective regions, uniform in shape and near each second tip vertex, removed, each side of said second tip, defined by two of said three second tip vertices, being a cutting edge, one of said cutting edges of said second tip being said second cutting edge.

5. The drill according to claim 3, wherein said tips comprise:

first, second and third tips, each tip having a same size as one another and a substantially equilateral triangular configuration defined by three vertices, with respective regions, uniform in shape near each vertex, removed, each side, defined by two of said three vertices, being a cutting edge;

each side of said first, second and third tips having a nick formed in a respective central portion;

said first and second tips being situated such that one side of said first tip and one side of said second tip are aligned with one another to form said first cutting edge; and said third tip being situated such that one side of said third tip is said second cutting edge.

6. The drill according to claim 3, wherein said tips comprise:

first and second tips, each tip having a substantially rectangular configuration defined by four vertices, with respective regions, uniform in shape, near opposite vertices, removed, each side being a cutting edge; and said first tip being fixed to the drill body such that a long side of said first tip is said first cutting edge and said second tip is fixed to the drill body such that a short side of said second tip is said second cutting edge.

7. The drill according to claim 3, wherein said tips comprise:

first through fourth tips, each tip having a same size as one another and substantially rectangular configuration defined by four vertices, with respective regions, uniform in shape, near opposite vertices, removed, each side being a cutting edge;

each long side of each tip having a nick formed in a respective central portion;

said first and second tips being fixed to the drill body such that first and second long sides of said respective first and second tips are aligned with one another to form said first cutting edge; and said third and fourth tips being fixed to the drill body such that first and second short sides of said respective third and fourth tips are aligned with one another to form said second cutting edge.

8. The drill according to claim 4, further comprising:

third and fourth tips, each of said third and fourth tips having a same size as one another and a substantially equilateral triangular configuration defined by three vertices, with respective regions, uniform in shape near each vertex, removed, each side, defined by two of said three vertices of said respective third and fourth tips, being a cutting edge;

said third tip having one cutting edge in line with said first cutting edge; and said fourth tip, having one cutting edge parallel to said second cutting edge and below said level of said second cutting edge in said direction of the tool center line by an amount equal to said lip height, symmetrical with said third tip about the tool center line.

* * * * *